(12) United States Patent
Littrell et al.

(10) Patent No.: US 10,001,391 B1
(45) Date of Patent: Jun. 19, 2018

(54) ADJUSTING RESONANT FREQUENCIES BASED ON FEEDBACK NETWORKS

(71) Applicant: Vesper Technologies Inc., Boston, MA (US)

(72) Inventors: Robert J. Littrell, Boston, MA (US); Karl Grosh, Ann Arbor, MI (US)

(73) Assignee: Vesper Technologies Inc., Boston, MA (US)

( * ) Notice: Subject to any disclaimer, the term of this patent is extended or adjusted under 35 U.S.C. 154(b) by 0 days. days.

(21) Appl. No.: 14/826,188

(22) Filed: Aug. 13, 2015

Related U.S. Application Data (60) Provisional application No. 62/037,510, filed on Aug. 14, 2014.

(51) Int. Cl.
| | |
|---|---|
| *G01D 18/00* | (2006.01) |
| *G01H 13/00* | (2006.01) |
| *H04R 3/06* | (2006.01) |
| *H04R 19/04* | (2006.01) |

(52) U.S. Cl.
CPC ............. *G01D 18/00* (2013.01); *G01H 13/00* (2013.01); *H04R 3/06* (2013.01); *H04R 19/04* (2013.01); *H04R 2201/003* (2013.01)

(58) Field of Classification Search
None
See application file for complete search history.

(56) References Cited

U.S. PATENT DOCUMENTS

| | | | | |
|---|---|---|---|---|
| 5,656,779 A | * | 8/1997 | Bronowicki | .......... B06B 1/0261 536/24.3 |
| 6,285,769 B1 | * | 9/2001 | Edelson | ................. H04R 3/002 381/111 |
| 2009/0116662 A1 | * | 5/2009 | Wu | ........................ H04R 3/007 381/94.2 |

\* cited by examiner

*Primary Examiner* — Robert R Raevis
(74) *Attorney, Agent, or Firm* — Fish & Richardson P.C.

(57) ABSTRACT

An electronic device comprises a sensor comprising first and second electrodes, with the sensor being configured for a first acoustic displacement due to input acoustic pressure; circuitry configured to measure a charge between the first and second electrodes due to the input acoustic pressure and to apply a voltage to cause a second acoustic displacement of the sensor that is out of phase with the first acoustic displacement, with the applied voltage further causing a charge to develop across the sensor, and with the first and second acoustic displacements causing an increase in damping in a resonance frequency of the sensor, relative to damping of the resonance frequency of the sensor prior to applying the voltage; and a passive electronic component configured to cancel out the charge developed across the sensor due to the applied voltage.

16 Claims, 9 Drawing Sheets

ADJUSTING RESONANT FREQUENCIES BASED ON FEEDBACK NETWORKS

CLAIM OF PRIORITY

This application claims the benefit of priority under 35 U.S.C. § 119(e) to provisional U.S. Patent Application No. 62/037,510, filed on Aug. 14, 2014, the entire contents of which are hereby incorporated by reference.

BACKGROUND

Various types of electrical devices have increased performance and sound quality with a flat frequency response and a high signal-to-noise ratio (SNR). These types of electrical devices include micro-electro-mechanical systems (MEMS) devices, MEMS capacitive microphones, and electret condenser microphones (ECMs) technology, and so forth. A higher SNR is achieved with a more compliant structure but more compliant structures have lower resonance frequencies and poorer frequency response. Acoustic or mechanical damping can be added to reduce the height of the resonance peak but this damping leads to lower SNR. Additionally, reduction of a resonance peak can be achieved by inserting a notch filter into a signal processing system. However, the device resonance frequency is dependent on the processing system and/or the casing of the processing system. As such, the notch filter needs to be customized for each casing and/or system to properly dampen the frequency response and does not provide a standardized damping mechanism.

In particular, the notch filter attenuates the response at a specific frequency. This frequency is designed to be the resonance frequency so that the attenuation matches (in both frequency and magnitude) the resonance peak and cancels the resonance peak. However, when installed in a package, the case will shift the resonance frequency slightly but the notch frequency will remain unchanged. That is, the frequency of a notch filter is independent of the casing of a package but the location of the resonance frequency is not independent of the casing. Therefore, the notch location and resonance frequency location do not align and the appropriate damping response is not achieved.

SUMMARY

In one example, a method includes sensing, by a sensoriactuator, a charge between electrodes in a device that includes the sensoriactuator; and electrically adjusting a resonance frequency of a response of the device by applying a voltage to the device that is proportional to a derivative of the sensed charge. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The device includes a Micro-Electro-Mechanical Systems (MEMS) device, an accelerometer, a transducer, an acoustic sensor, a sensor, a microphone or a gyroscope. Electronically adjusting comprises electronically damping.

In another example, an electronic device comprises a sensor comprising first and second electrodes, with the sensor being configured for a first acoustic displacement due to input acoustic pressure; circuitry configured to measure a charge between the first and second electrodes due to the input acoustic pressure and to apply a voltage to cause a second acoustic displacement of the sensor that is out of phase with the first acoustic displacement, with the applied voltage further causing a charge to develop across the sensor, and with the first and second acoustic displacements causing an increase in damping in a resonance frequency of the sensor, relative to damping of the resonance frequency of the sensor prior to applying the voltage; and a passive electronic component configured to cancel out the charge developed across the sensor due to the applied voltage.

In this example, the electronic device is a Micro-Electro-Mechanical Systems (MEMS) device, an accelerometer, a transducer, an acoustic sensor, a microphone or a gyroscope, and wherein the sensor, circuitry and passive electronic component are packaged in the electronic device. The circuitry comprises the passive electronic component. The circuitry comprises: a differential charge amplifier configured to sense the charge between the first and second electrodes due to the input acoustic pressure and to output an output voltage based on the sensed charge; and a differentiator with gain configured to receive the output voltage as an input to the differentiator with gain, further configured to apply a transfer function to the output voltage to produce a feedback voltage that is the applied voltage, wherein the transfer function is based on the gain of the differentiator, with the gain being adjustable to produce a specified amount of damping, and wherein the differentiator outputs a feedback voltage that is fed back into the sensor and into the passive electronic component to dampen the resonance frequency of the sensor.

In this example, the sensor comprises a piezoelectric beam or a piezoelectric plate, wherein the first acoustic displacement caused by the input acoustic pressure and the second acoustic displacement caused by the applied voltage is a total acoustic displacement; wherein a charge is generated on the sensor due to the total acoustic displacement, in accordance with a relationship between displacement and a charge that is inherent in the piezoelectric beam or the piezoelectric plate; wherein the sensor is configured to aggregate a charge developed across the sensor due to the applied voltage and the charge generated on the sensor due to the total acoustic displacement; wherein the circuitry comprises a differential charge amplifier to: develop a negative charge across the passive electronic component to cancel out the charge developed across the sensor due to the applied voltage; electronically sum the aggregated charge and the negative charge developed across the passive electronic component such that the charge generated on the sensor due to displacement remains; and set a gain of the charge amplifier to obtain an appropriate amount of output voltage; wherein the circuitry is further configured to apply a transfer function to the output voltage to produce a feedback voltage that is the applied voltage, with the feedback voltage being fed back into the sensor to cause the second acoustic displacement of the sensor and the charge to develop across the sensor. The applied voltage is proportional to a derivative of the measured charge. The sensor and circuitry comprise a sensoriactuator for sensing the charge between the electrodes and for actuating movement of the first sensor based on the applied voltage.

In still another example, the method comprises producing a feedback voltage for the device by applying a transfer function to an output voltage of the device, with the transfer function being based on a gain that is selected to achieve a specified amount of adjustment to the resonance frequency of the device; applying the feedback voltage to the device to cause acoustic displacement of the device and a charge to develop across the device, with the acoustic displacement caused by the applied feedback voltage causing an adjustment to the resonance frequency of the device; developing, by a differential charge amplifier, a negative charge across a passive electronic component electrically connected to the device; electrically summing the developed negative charge with the charge developed across the device to cancel the charge developed across the device such that the acoustic displacement caused by the applied feedback voltage remains; and adjusting the output voltage of the device, based on the adjusted resonance frequency. Other embodiments of this aspect include corresponding computer systems, apparatus, and computer programs recorded on one or more computer storage devices, each configured to perform the actions of the methods.

In this example, the modified resonance frequency is: an increased amount of damping to the resonance frequency, relative to an amount of damping prior to application of the feedback voltage; or a decreased amount of damping to the resonance frequency, relative to the amount of damping prior to application of the feedback voltage the device is a Micro-Electro-Mechanical Systems (MEMS) device, an accelerometer, a transducer, an acoustic sensor, a microphone or a gyroscope. The adjustment to the resonance frequency is substantially independent of a casing of a package that holds the device.

In still another example, a method comprises applying a voltage to a stationary plate in a back cavity of a MEMS microphone to form a charged plate; exerting, by the charged plate, an opposing force to a moving diaphragm of the back cavity, with the opposing force being opposite a force that is generated by movement of the diaphragm; wherein the opposing force forms a negative stiffness that functions as increasing a volume of a back cavity of a MEMS microphone. Other embodiments of this aspect include corresponding computer systems, apparatus, and computer programs recorded on one or more computer storage devices, each configured to perform the actions of the methods.

In yet another example, the method comprises decreasing a stiffness of a sensoriactuator in the MEMS microphone by applying to the MEMS microphone transducer a voltage that is proportional to a microphone output voltage; wherein the applied voltage creates a negative stiffness that performs the same function as increasing the volume of the back cavity of the MEMS microphone. Other embodiments of this aspect include corresponding computer systems, apparatus, and computer programs recorded on one or more computer storage devices, each configured to perform the actions of the methods. The actions of this method include artificially generating a negative stiffness that when added to an inherent stiffness decreases the stiffness.

In an example, a method comprises sensing, by a sensoriactuator, a voltage between electrodes in a device that includes the sensoriactuator; and electrically adjusting a resonance frequency of a response of the device by applying a charge to the device that is proportional to a derivative of the sensed voltage. Other embodiments of this aspect include corresponding computer systems, apparatus, and computer programs recorded on one or more computer storage devices, each configured to perform the actions of the methods. In this example, the device is a Micro-Electro-Mechanical Systems (MEMS) device, an accelerometer, a transducer, an acoustic sensor, a sensor, a microphone or a gyroscope.

In yet another example, an electronic device comprises a sensor comprising first and second electrodes, with the sensor being configured for a first acoustic displacement due to input acoustic pressure; circuitry configured to measure a voltage between the first and second electrodes due to the input acoustic pressure and to apply a charge to cause a second acoustic displacement of the sensor that is out of phase with the first acoustic displacement, with the applied charge further causing a voltage to develop across the sensor, and with the first and second acoustic displacements causing an increase in damping in a resonance frequency of the sensor, relative to damping of the resonance frequency of the sensor prior to applying the charge; and a passive electronic component configured to cancel out the voltage developed across the sensor due to the applied charge.

The details of one or more implementations are set forth in the accompanying drawings and the description below. Other features, objects, and advantages will be apparent from the description, the drawings, and the claims.

DETAILED DESCRIPTION

Resonance is the tendency of a system to oscillate with greater amplitude at some frequencies than at others. Frequencies at which the response amplitude is a relative maximum are known as the system's resonance frequencies or peaks. At these resonance frequencies, even small periodic driving forces can produce large amplitude oscillations, because the system stores vibrational energy.

Figure 1A:
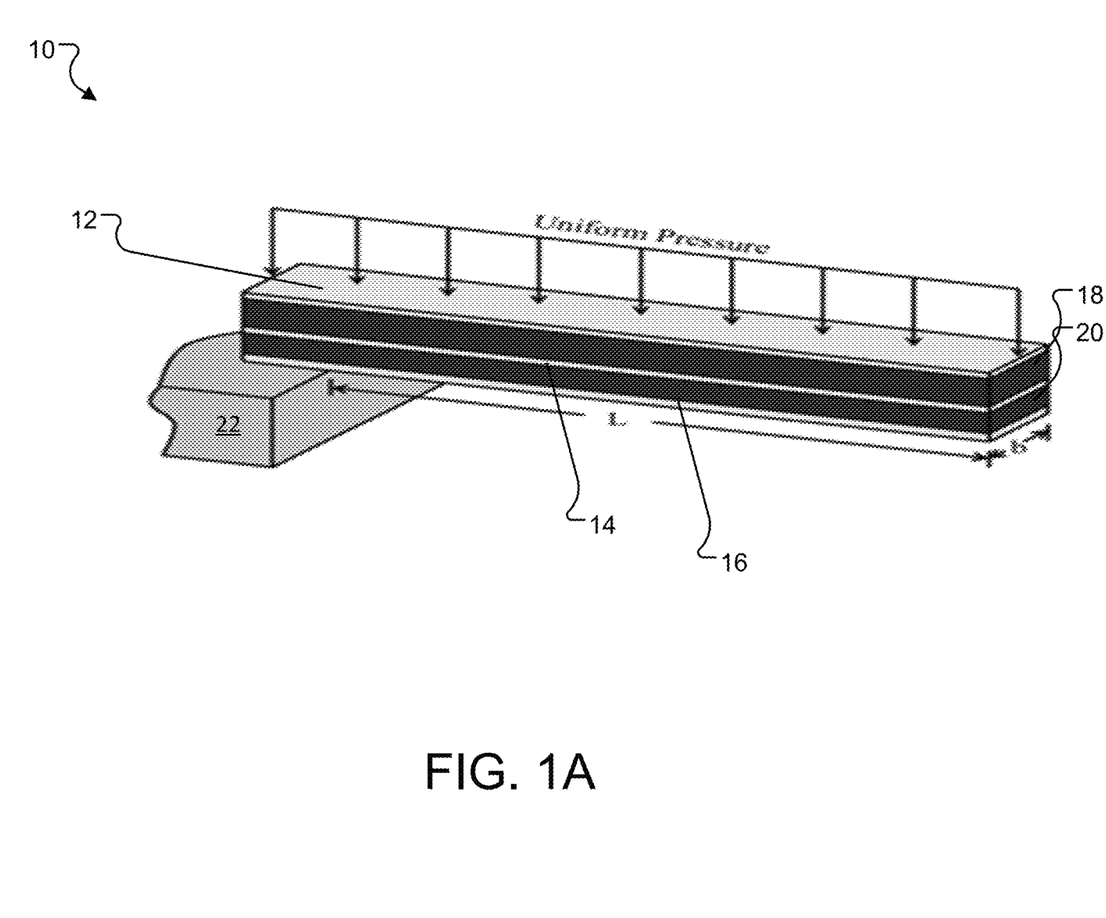
FIG. 1A is a diagram of a beam.

Referring to FIG. 1A, plate 10 (such as a cantilever or a transducer beam) includes electrode layers 12, 14, 16 and piezoelectric materials 18, 20, as described in U.S. Pat. No. 9,055,372, the entire contents of which are incorporated herein by reference. In this example, plate 10 comprises a piezoelectric beam or a piezoelectric plate. In this example, plate 10 is attached to base 22 (e.g., a plate base in a transducer or in a package). In this example, the uniform pressure represents acoustic pressure. These beams are so small compared to a wavelength of sound that the acoustic pressure is uniform across the entire beam.

In this example, plate 10 oscillates with a greater amplitude at particular frequencies, decreasing performance and sound quality of the electronic device (such as a microphone) that includes a package with plate 10. In this example, plate 10 is a beam in a MEMS transducer (e.g., of a MEMS microphone).

Figure 1B:
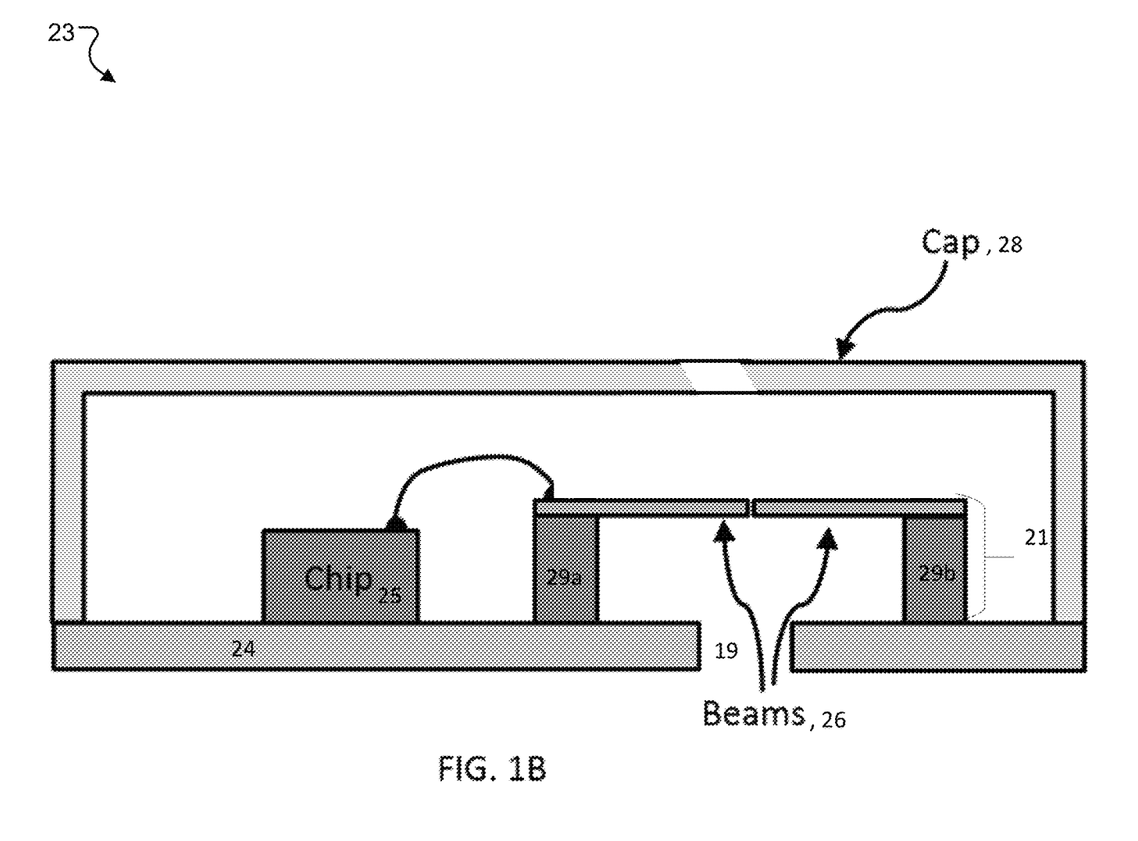
FIGS. 1B and 4 are each diagrams of a packaged sensor.

Referring to FIG. 1B, package 23 includes substrate 24 and cap 28, which encloses substrate 24 and sensor 21 that is fabricated on substrate 24. In this example, sensor 21 includes beams 26. Beams 26 are attached to substrate 24 via bases 29a, 29b. Acoustic port 19 receives pressure and input acoustic waves. In this example, beams 26 act as the diaphragm. In this example, beams 26 vibrate with greater amplitude at some frequencies than at other frequencies. Package 23 includes chip 25 (or other electronic circuitry) that performs electrical damping of the resonance frequencies of sensor 21 to provide a flatter or substantially flat frequency response (e.g., a frequency response with an increased amount of linearity or flatness, relative to the linearity or flatness of a frequency response without the electrical damping) and high SNR, using the techniques described below. Chip 25 is wire bonded to sensor 21 and/or is electrically connected to sensor 21 for communication with sensor 21.

For a flat frequency response and a high SNR, piezoelectric or capacitive structures are used as sensoriactuators—structures that act as both sensors and actuators. In the example in FIG. 1B, piezoelectric structures (e.g., beams 26) are used as sensoriactuators. In this example, beams 26 include piezoelectric materials sandwiched between electrodes or plates, as shown in FIG. 1A. In another example, a sensor is a condenser or capacitive microphone that includes a backplate. In this example, a capacitor is formed by the beams and backplate and acts as the sensoriactuator. For example, a MEMS microphone can be used as a sensoriactuator. By using a sensor 21 (e.g., a MEMS microphone) or other electronic device as a sensoriactuator, electrical damping is added by chip 25 sensing (e.g., determining or measuring) a charge generated across the plates (e.g., electrodes) of beams 26 of sensor 21 and then applying (via the electronic circuitry or chip 25) a voltage to sensor 21 that is proportional to the derivative of this sensed charge. The applied voltage electrically dampens a resonance peak, thereby promoting a flat frequency response of sensor 21. The addition of damping does not add noise to sensor 21 and results in a flatter frequency response.

A MEMS microphone (or other type of electric device) applies a voltage to perform electrical damping, in accordance with the below equation:

$$\frac{V_{out}}{P_{in}} = \left( \frac{d \cdot A}{m_1 s^2 + b_1 s + k_1 - FB \cdot B \cdot d \cdot A} \right)$$ Equation 1

In this example, $V_{out}$ is the microphone system output voltage, $P_{in}$ is the input acoustic pressure, d is the piezoelectric constant that relates the acoustic displacement to the charge generated by this transducer, A is the gain of a charge amplifier, $m_1$ is the acoustic mass of the microphone, $b_1$ is the acoustic damping of the microphone, $k_1$ is the acoustic stiffness of the microphone, FB is the transfer function of the feedback network, and B is a constant relating the voltage applied to the microphone to the acoustic displacement of the microphone. The above equation illustrates the relationship between $P_{in}$ (the input acoustic pressure, e.g., from a person speaking into the microphone) and $V_{out}$ (the output voltage of the MEMS microphone). Without feedback, the relationship between output voltage and input pressure would be $$\frac{V_{out}}{P_{in}} = \left( \frac{d \cdot A}{m_1 s^2 + b_1 s + k_1} \right).$$

From these equations, it can be seen that, if the feedback transfer function FB=−Cs, then the damping, $b_1$, is effectively increased to ($b_1$+C·B·d·A). Therefore, the gain of the feedback network, C, can be adjusted to achieve the desired amount of damping. In this example, "s" represents the complex frequency variable "s" in the Laplace transform.

Figure 2A:
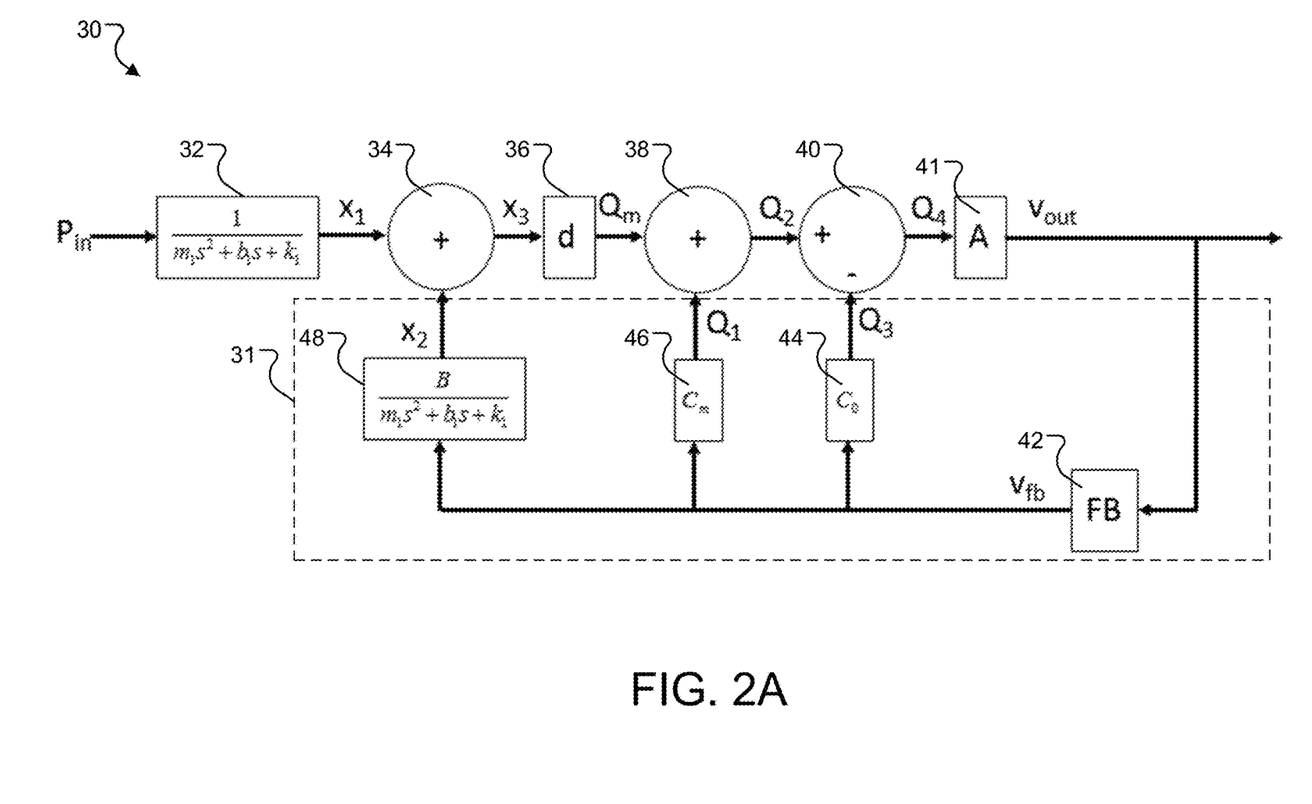
FIGS. 2A and 2C are each block diagrams of electrically damping a resonance frequency.

Referring to FIG. 2A, feedback mechanism 30 reduces a resonance peak (e.g., of an acoustic sensor such as a microphone). In this example, feedback mechanism 30 is implemented by electronic circuitry in combination with a sensor. In this example, $P_{in}$ is the input acoustic pressure (e.g., into the acoustic sensor). Block 32 represents the relationship between applied pressure and displacement, e.g., to describe the mechanics of the beam. When pressure is applied, the beam moves. The relationship represented by block 32 and $P_{in}$ result in $x_1$, which is the acoustic displacement of the sensor due to input acoustic pressure. In this example, block 32 represents the following relationship:

$$\frac{1}{m_1 s^2 + b_1 s + k_1},$$

which represents the piezoelectric sensor. That is, block 32 is the transfer function between input acoustic pressure and acoustic displacement.

In this example, an acoustic pressure is mechanically applied to the beam and a voltage is applied to the same beam. Block 34 represents that the effect of this is that the beam displacement ($x_3$) is a sum of that due to the applied pressure with that due to the applied voltage. That is, the sum of $x_1$ and $x_2$, which is the acoustic displacement of the sensor due to an applied voltage, is total acoustic displacement of sensor ($x_3$) of the sensor. In this example, the voltage is applied by electronic circuitry in the sensor or in a package that includes the sensor. Based on the aggregation of $x_1$ and $x_2$, total acoustic displacement of sensor ($x_3$) results. In this example, the relationship between displacement ($x_3$) and charge that is inherent in the piezoelectric beam (i.e., "d" represented by block 36) results in $Q_m$, which is the charge generated on the sensor due to displacement. d is the piezoelectric constant relating acoustic displacement to charge for this sensor. This constant d is a function of the piezoelectric material properties and sensor geometry.

In this example, the sensor sums (e.g., inherently sums) $Q_m$ and $Q_1$, as represented by block 38, which is the total charge on the sensor. $Q_1$ is the charge developed across the sensor due to applied voltage $v_{fb}$. In this example, the charge on the sensor is due to the acoustic displacement as well as the applied electric voltage. These two inherently sum at the sensor. The one or more electrical systems apply an operation (e.g., a subtraction operation as represented by block 41) to $Q_2$ and $Q_3$, which is the charge developed across a dummy capacitor 44 (e.g., a passive electrical component) of the same size as the sensor (e.g., microphone), such that $C_m = C_0$, with $C_m$ being the capacitance of the sensor and $C_0$ being the capacitance of the dummy capacitor. In this example, block 40 represents a differential charge amplifier (e.g., to charge $Q_3$) that creates the negative charge on $Q_3$ to cancel $Q_1$, e.g., when $Q_1$ is electronically summed with $Q_3$. Based on the operation of block 40, feedback mechanism 30 produces $Q_4$, which is the total charge across the sensor minus the charge across the dummy capacitor 44.

In this example, feedback mechanism 30 applies charge amplifier 41 to $Q_4$ to set the gain to obtain an appropriate amount of output voltage. Charge amplifier 41 is implemented on circuitry that is external to the sensor (e.g., and included in the package). In this example, charge amplifier 41 is applying A, the gain of the charge amplifier, to $Q_4$, e.g., by multiplying A by $Q_4$. In this example, feedback mechanism 30 produces $V_{out}$, which is the system (e.g., sensor) output voltage, e.g., output voltage of charge amplifier with gain of A. In this example, $V_{out}$ is an output voltage of the sensor. For example, $V_{out}$ is the output of the microphone. This would be the signal that is used by other circuitry connected to the microphone in a device such as a phone. In this example, blocks 40, 41 together form the charge amplifier. In this example, loop 31 is executed in real-time (e.g., or in near real-time) to adjust $V_{out}$ to be a dampened voltage.

In a variation of FIG. 2A, feedback mechanism includes a voltage amplifier, rather than charge amplifier 40, 41, to provide a feedback charge. In this example, the charges ("$Q_s$") would be voltages in the feedback mechanism, as described below with regard to FIG. 2C.

Feedback mechanism 30 also applies operation 42 (e.g., a multiplicative operation) to $v_{out}$ to produce $v_{fb}$, which is the feedback voltage applied to the sensor. In this example, operation 42 includes transfer function of a feedback network, such as a gain but could also be an integrator or differentiator with some gain or a combination of all of these. Portion 31 of feedback mechanism 30 represents a damping feedback loop to dampen the resonance frequency of the sensor. In this example, damping feedback loop may be implemented on a chip that is separate from the sensor. In this example, application of $v_{fb}$ moves the plate of the sensor, which in turns causes a charge across the mechanical and electrical components, e.g., the plate of the sensor and a capacitor of the sensor ($C_m$), respectively. The mechanical component is visually shown as block 48 in feedback mechanism 30. In this example, the mechanical component is represented by $$\frac{B}{m_1 s^2 + b_1 s + k_1},$$

which is a transfer function that represents the beam. In this example, $$\frac{B}{m_1 s^2 + b_1 s + k_1}$$

is the relationship between the applied voltage and the acoustic displacement. Because it is the same beam as described by block 32, it has the same $m_1$, $b_1$, and $k_1$. In this example, block 46 represents the capacitor of the microphone, with capacitance $C_m$. In this example, a single structure (e.g., the piezoelectric material sandwiched between electrodes) is mechanically a beam and electrically a capacitor. To cancel out $C_m$, a dummy capacitor, represented by block 44, is inserted into feedback mechanism 30, to leave only the charge due to mechanical motion on the mechanical component (e.g., the plate). By leaving the charge due to mechanical motion on the plate, the total displacement is reduced by the feedback voltage, which causes the damping of the resonance frequency of the sensor. In this example, the displacement caused by the feedback voltage is represented as $x_2$. In this example, $x_2$ is a displacement that is out of phase with the initial displacement $x_1$ at the resonance frequency. Accordingly, when $x_1$ and $x_2$ are summed the total displacement of the sensor is reduced.

In this example, feedback mechanism 30 illustrates how a MEMS microphone is used as a sensor/actuator, by including circuitry in the microphone (or in a package that includes the microphone) that senses a charge generated across the plates (which is derived from $V_{out}$) and then applying a voltage $v_{fb}$ to the microphone that is proportional to the derivative of this sensed charge, e.g., as specified by FB in operation 42. The proportionality would be the constant, "C," in the example where FB=−Cs. The applied voltage $v_{fb}$ electrically dampens a resonance peak, thereby promoting a flat frequency response.

Figure 2B:
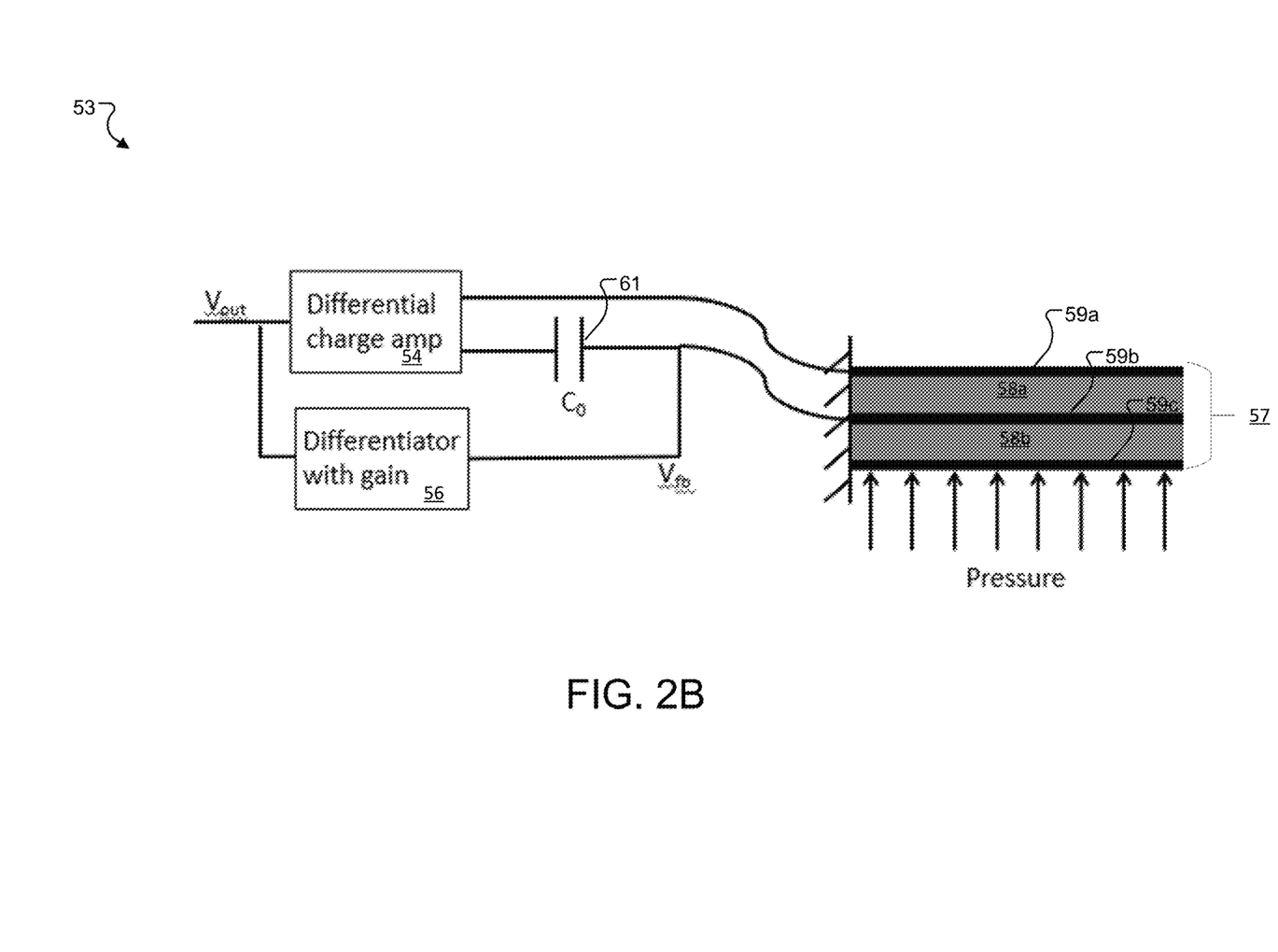
FIG. 2B is a block diagram of components for electrically damping a resonance frequency.

Referring to FIG. 2B, diagram 53 is a diagram of the physical components included in a package for using feedback to increase microphone damping. In this example, beam 57 includes plates 59a, 59b, 59c, including, e.g., electrodes. Beam 57 also includes piezoelectric materials 58a, 58b. In this example, differential charge amplifier 54 is connected (e.g., electrically connected) to plates 59a, 59b, e.g., to sense a charge across those plates 59a, 59b. In response to the sensed charge, differential charge amplifier 54 outputs an output voltage ($v_{out}$) to differentiator with gain 56, which in turn outputs a feedback voltage ($v_{fb}$). Differentiator with gain 56 produces $v_{fb}$ using the above described techniques, e.g., the techniques described with regard to block 42 in FIG. 2A. $v_{fb}$ is fed back through differential charge amplifier 54, via dummy capacitor 61, to produce a dampened $V_{out}$.

Figure 2C:
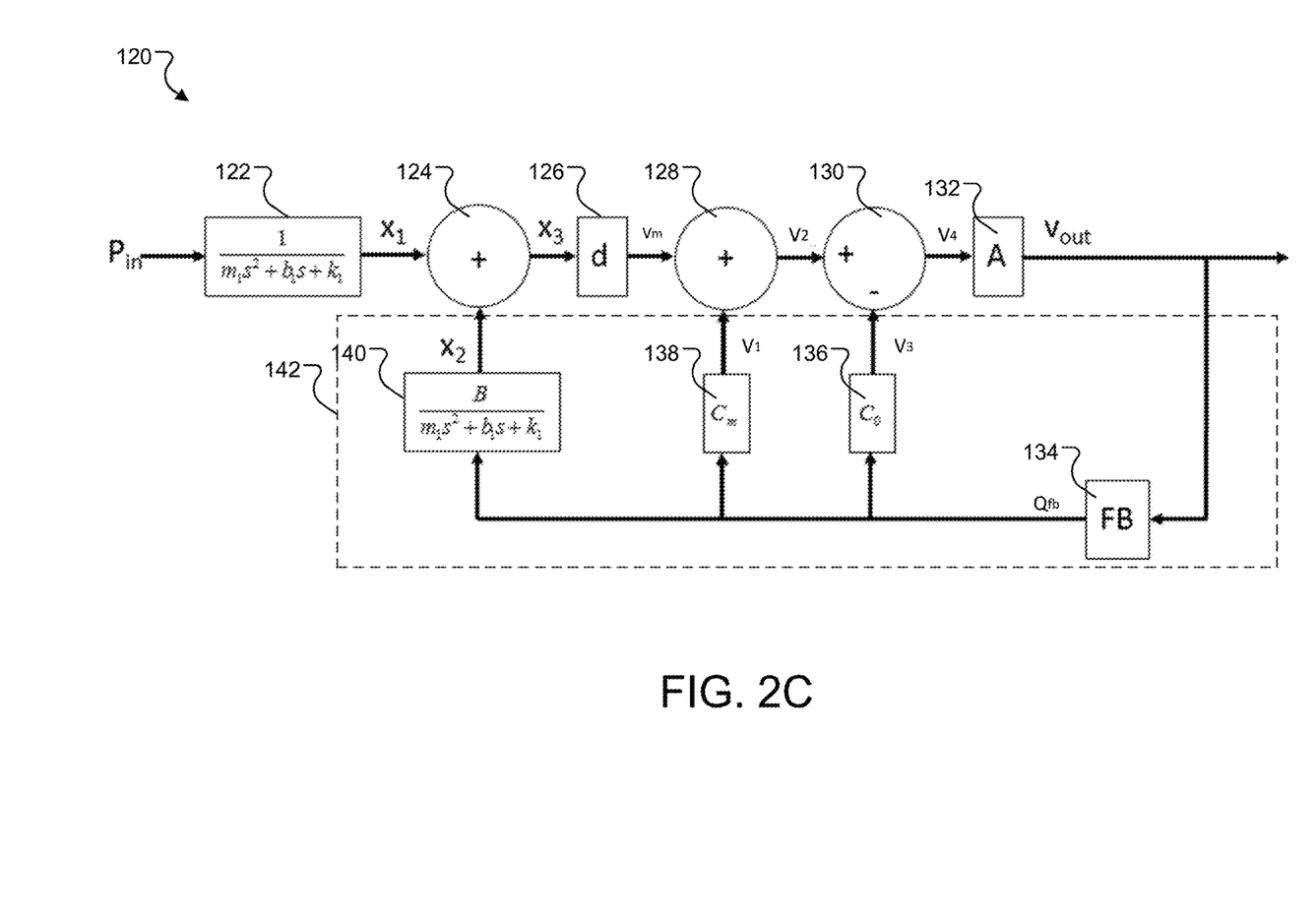

Referring to FIG. 2C, feedback mechanism 120 reduces a resonance peak (e.g., of an acoustic sensor such as a microphone) by applying a feedback charge, $Q_{fb}$. In this example, feedback mechanism 120 is implemented by electronic circuitry in combination with a sensor. In this example, $P_{in}$ is the input acoustic pressure (e.g., into the acoustic sensor). Block 122 represents the relationship between applied pressure and displacement, e.g., to describe the mechanics of the beam. When pressure is applied, the beam moves. The relationship represented by block 122 and $P_{in}$ result in $x_1$, which is the acoustic displacement of the sensor due to input acoustic pressure. That is, the relationship of block 122 governs the amount of displacement due to $P_{in}$. In this example, block 122 represents the following relationship:

$$\frac{1}{m_1 s^2 + b_1 s + k_1},$$

which represents the piezoelectric sensor. In particular, block 122 is the transfer function between input acoustic pressure and acoustic displacement.

In this example, an acoustic pressure is mechanically applied to the beam and a charge, $Q_{fb}$, is applied to the same beam. Block 124 represents that the effect of this is that the beam displacement ($x_3$) is a sum of that due to the applied pressure with that due to the applied charge. That is, the sum of $x_1$ and $x_2$, which is the acoustic displacement of the sensor due to an applied charge is total acoustic displacement of sensor ($x_3$). In this example, the charge is applied by electronic circuitry in the sensor or in a package that includes the sensor. Based on the aggregation of $x_1$ and $x_2$, total acoustic displacement of sensor ($x_3$) results. In this example, the relationship between displacement ($x_3$) and voltage that is inherent in the piezoelectric beam (i.e., "d" represented by block 126) results in $V_m$, which is the voltage generated on the sensor due to displacement. In this example, d is the piezoelectric constant relating acoustic displacement to voltage for this sensor. However, in this example d is represented as V/m³ (i.e., volt per cubic meter), rather than C/m³ as it was represented in FIG. 2A. This constant d is a function of the piezoelectric material properties and sensor geometry.

In this example, the sensor sums (e.g., inherently sums) $V_m$ and $V_1$, as represented by block 128, which is the total voltage on the sensor. $V_1$ is the voltage developed across the sensor due to applied charge $Q_{fb}$. In this example, the voltage on the sensor is due to the acoustic displacement as well as the applied electric charge. These two inherently sum at the sensor. The one or more electrical systems apply an operation (e.g., a subtraction operation or an aggregation operation as represented by block 130) to $V_2$ and $V_3$, which is the voltage developed across a dummy capacitor 136 (e.g., a passive electrical component) of the same size as the sensor (e.g., microphone), such that $C_m=C_0$, with $C_m$ being the capacitance of the sensor and $C_0$ being the capacitance of the dummy capacitor. In this example, block 130 represents a differential voltage amplifier that produces a negative voltage on $V_3$ to cancel $V_1$, e.g., when $V_1$ is electronically summed with $V_3$. Based on the operation of block 130, feedback mechanism 120 produces $V_4$, which is the total voltage across the sensor minus the voltage across the dummy capacitor 136.

In this example, feedback mechanism 120 applies voltage amplifier 132 to $V_4$ to set the gain to obtain an appropriate amount of output voltage. Voltage amplifier 132 is implemented on circuitry that is external to the sensor (e.g., and included in the package). In this example, voltage amplifier 132 is applying A, the gain of the voltage amplifier, to $V_4$, e.g., by multiplying A by $V_4$. In this example, feedback mechanism 120 produces $V_{out}$, which is the system (e.g., sensor) output voltage, e.g., output voltage of voltage amplifier with gain of A. In this example, $V_{out}$ is an output voltage of the sensor. For example, $V_{out}$ is the output of the microphone. This would be the signal that is used by other circuitry connected to the microphone in a device such as a phone. In this example, blocks 130, 132 together form the voltage amplifier. In this example, loop 142 is executed in real-time (e.g., or in near real-time) to adjust $V_{out}$ to be a dampened voltage.

Feedback mechanism 120 also applies operation 134 (e.g., a multiplicative operation) to $V_{out}$ to produce $Q_{fb}$, which is the feedback charge applied to the sensor. In this example, operation 134 includes transfer function of a feedback network, such as a gain but could also be an integrator or differentiator with some gain or a combination of all of these. Portion 142 of feedback mechanism 120 represents a damping feedback loop to dampen the resonance frequency of the sensor. In this example, damping feedback loop may be implemented on a chip that is separate from the sensor. In this example, application of $Q_{fb}$ moves the plate of the sensor, which in turns causes a voltage across the mechanical and electrical components, e.g., the plate of the sensor and a capacitor of the sensor ($C_m$), respectively. In this example, the mechanical and electrical components are actually a same component—the beam. The mechanical representation of the beam is shown in block 140 and the electrical representation of the beam is shown in block 138. In this example, the mechanical component is represented by $$\frac{B}{m_1 s^2 + b_1 s + k_1},$$

which is a transfer function that represents the beam. In this example, $$\frac{B}{m_1 s^2 + b_1 s + k_1}$$

is the relationship between the applied charge and the acoustic displacement. However, in this example B is represented as $V/m^3$ (i.e., volt per cubic meter), rather than $C/m^3$ as it was represented in FIG. 2A. Because it is the same beam as described by block 122, it has the same $m_1$, $b_1$, and $k_1$. In this example, block 138 represents the capacitor of the microphone, with capacitance $C_m$. In this example, a single structure (e.g., the piezoelectric material sandwiched between electrodes) is mechanically a beam and electrically a capacitor. To cancel out $C_m$, a dummy capacitor, represented by block 136, is inserted into feedback mechanism 120, to leave only the voltage on the mechanical component (e.g., the plate). By leaving the voltage due to mechanical motion on the plate, the total displacement is reduced by the feedback charge, which causes the damping of the resonance frequency of the sensor. In this example, the displacement caused by the feedback charge is represented as $x_2$. In this example, $x_2$ is a displacement that is out of phase with the initial displacement $x_1$ at the resonance frequency. Accordingly, when $x_1$ and $x_2$ are summed the total displacement of the sensor is reduced.

In this example, feedback mechanism 120 illustrates how a MEMS microphone is used as a sensoriactuator, by including circuitry in the microphone (or in a package that includes the microphone) that senses a voltage generated across the plates (which is derived from $V_{out}$) and then applying a charge $Q_{fb}$ to the microphone that is proportional to the derivative of this sensed voltage, e.g., as specified by FB in operation 132. The proportionality would be the constant, "C," in the example where FB=−Cs. In this example, C is the gain of feedback loop 142. The applied charge $Q_{fb}$ electrically dampens a resonance peak, thereby promoting a flat frequency response.

Using the techniques, a sensoriactuator senses a voltage between electrodes in a device that includes the sensoriactuator; and electrically adjusts a resonance frequency of a response of the device by applying a charge to the device that is proportional to a derivative of the sensed voltage. Additionally, using these techniques, an electronic device includes a sensor comprising first and second electrodes, with the sensor being configured for a first acoustic displacement due to input acoustic pressure; circuitry configured to measure a voltage between the first and second electrodes due to the input acoustic pressure and to apply a charge to cause a second acoustic displacement of the sensor that is out of phase with the first acoustic displacement, with the applied charge further causing a voltage to develop across the sensor, and with the first and second acoustic displacements causing an increase in damping in a resonance frequency of the sensor, relative to damping of the resonance frequency of the sensor prior to applying the charge; and a passive electronic component configured to cancel out the voltage developed across the sensor due to the applied charge.

Using the techniques described in the foregoing FIGS. 2A-2C, adjustment to the resonance frequency (via active damping described herein) is substantially independent of a casing of a package that holds the device. As such, the method of using active damping to attenuate the resonance peak is much more robust to variation in the case or package, e.g., relative to using a notch filter.

Example, Using Feedback to Increase Microphone Damping

Referring back to FIG. 1A, plate 10 is a piezoelectric cantilever beam used as a microphone. The cantilever has length, L, width, b, height, H, and uniform acoustic pressure across the surface. The top half consists of piezoelectric material. The electrodes have negligible thickness. The beam has modulus of elasticity, E, area moment of inertia, I, and density, ρ.

For this example, H=1 um, E=300 GPa, ρ=3000 kg/m³, b=30 um, and L=328 um, giving a resonance frequency of about 15 kHz using the equation $$f_n = \frac{1.875^2}{2\pi L^2} \sqrt{\frac{EI}{\rho A}}.$$

Figure 3:
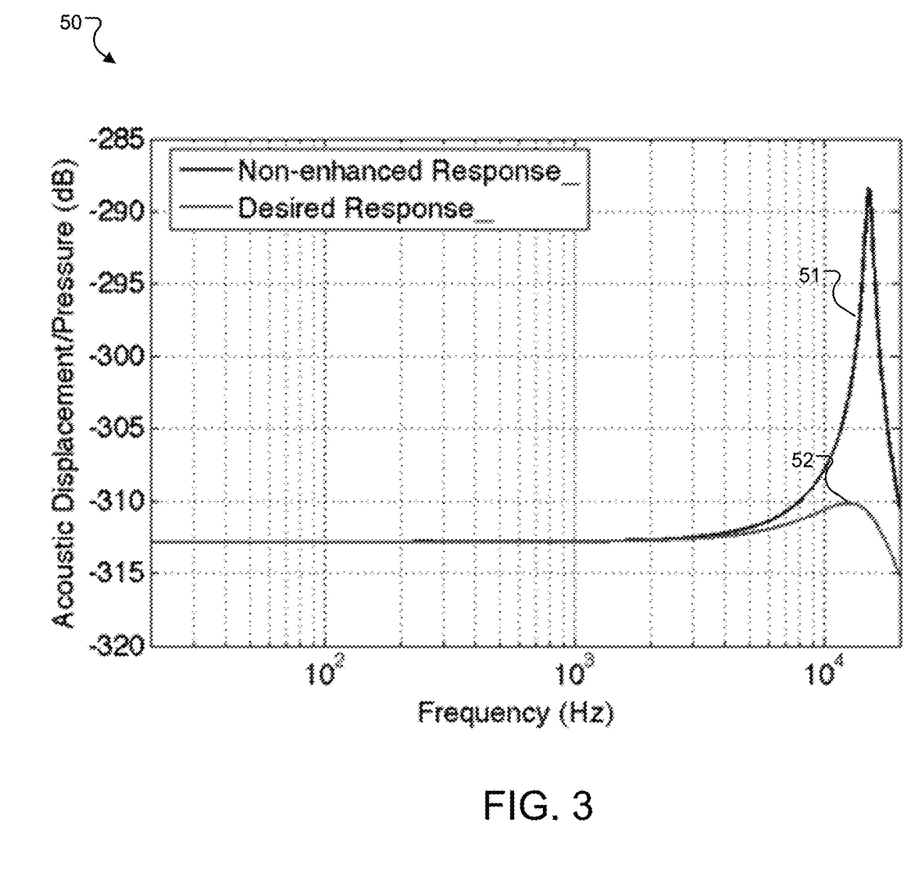
FIG. 3 is a diagram of response curves.

Because 15 kHz is in the audible range of frequencies, a large increase in sensitivity at this frequency is undesirable. Therefore, it is advantageous to use active feedback to reduce the resonance frequency. The acoustic stiffness, $k_1$, and acoustic mass, $m_1$ can be determined from the equations $$k_1 = \frac{P}{\int_A w(x,y)dA}$$

$$m_1 = \frac{\rho H \int_A w(x,y)^2 dA}{\left(\int_A w(x,y)dA\right)^2}$$

where A is the sensor area and w is the beam deflection. For a beam with uniform pressure load at low frequency, the deflection, w, is $$w = \frac{Pb}{EI}\left(\frac{1}{24}x^4 - \frac{1}{6}Lx^3 + \frac{1}{4}L^2x^2\right)$$

where x is the variable along the length of the beam. In this example, the acoustic stiffness of the beam is 4.39e15 Pa/m³ and the acoustic mass is 4.89e5 kg/m⁴. The damping term, $b_1$, varies depending on the microphone package and device into which it is installed but the damping is typically very low. A reasonable estimate would be $b_1$=2.78e9. Referring now to FIG. 3, diagram 50 displays acoustic displacement at various frequencies. These parameters $m_1$, $k_1$, and $b_1$ together give a frequency response 51 shown in FIG. 3 labeled the "Non-enhanced Response," and show the relationship between the acoustic pressure, $P_{in}$, and the acoustic displacement, $x_1$.

To convert from acoustic displacement to charge, the piezoelectric constitutive equations are used. For the beam of FIG. 1 in which half of the thickness is piezoelectric, the output charge at low frequency is $$Q = \frac{Pb^2L^3d_{31}H}{24I}$$

where $d_{31}$ is the piezoelectric coupling coefficient. Therefore, in the block diagram, $$d = \frac{Q}{x} = \frac{5}{6}\frac{d_{31}HE}{L^2}.$$

In this example, if $d_{31}$=−3.00 pC/N, then d=6.97 C/m³, i.e., Coulomb per cubic meter. Referring back to FIG. 2A, "d" is represented in block 36.

For a cantilever beam, the displacement generated by an applied voltage at low frequency is $$w = \frac{1}{8}\frac{d_{31}VHb}{I}x^2$$

and, therefore, the variable B in the block diagram (e.g., block 48 in FIG. 2A) is $$B = \frac{5}{6}\frac{d_{31}HE}{L^2}.$$

In this example, B=6.97 C/m³. If the dummy capacitor is selected to equal the capacitance of the MEMS sensor, $C_m$=$C_0$, and the feedback transfer function to equal FB=−Cs, then the new damping term is equal to $b_1$+C*B*d*A. A is set such that the desired output sensitivity is achieved and CA is adjusted so that the damping term changes from $b_1$=2.78e9 to 3.71e10 in order to achieve the desired response 52 shown in FIG. 3. In this example, the product C·A is set to be C·A=7.06e8 to achieve the desired response. This feedback could be implemented with analog or digital circuitry.

The feedback method described by the above equation 1 is also used to artificially increase microphone back cavity volume by using negative stiffness. Generally, microphone back cavity volume is proportional to the size of a volume in the back cavity of a microphone. Generally, negative stiffness is an occurrence of a deforming force and a resulting displacement being in opposite directions. It is desirable to make MEMS microphones as small as possible. One limitation to making microphones small is the stiffness of the back cavity. As the back cavity becomes smaller, it becomes stiffer, reducing the sensitivity and SNR of the microphone. To reduce the microphone back cavity stiffness, a negative stiffness is added to the microphone in parallel with the back cavity stiffness. Generally, a microphone diaphragm is a thin piece of material or materials (such as polysilicon, AlN, gold, etc.), which vibrates when it is struck by sound waves. A negative stiffness can be achieved in many ways, for example, electrostatically, as shown in FIG. 4.

Figure 4:
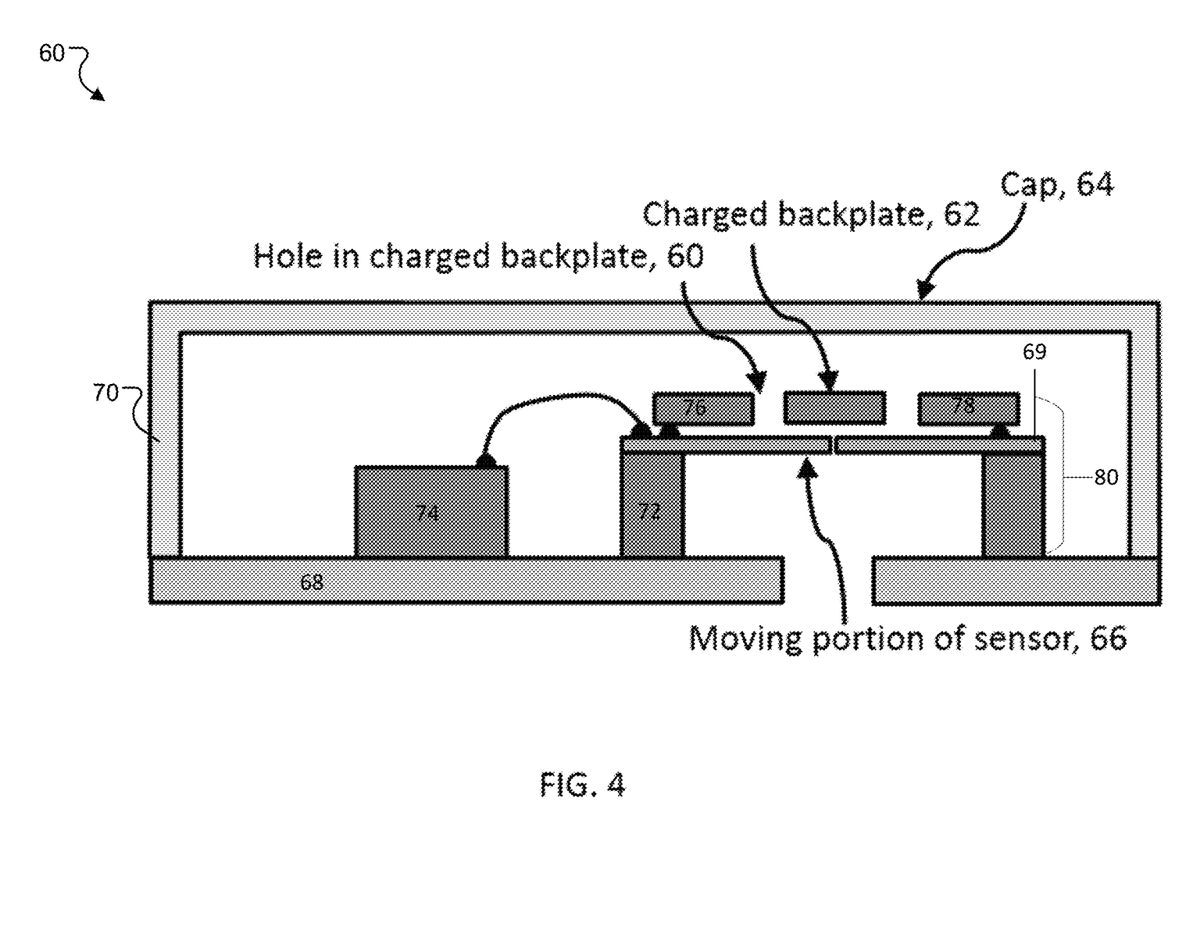

Referring now to FIG. 4, package 60 includes substrate 68 on which sensor 80 is fabricated and cap 64 that houses substrate 68 and sensor 80. Sensor 80 includes plates 66, 69 (or cantilevers), which are moving portions of sensor 80. Plates 66, 69 are also the diaphragm of sensor 80. Hereinafter, plates 66, 69 may collectively be referred to as diagram 66, 69. In this example, plate 66 is attached to (and/or fabricated on) base 72, e.g., a beam back. Covering 70 encloses substrate 68 with sensor 80.

As the moving diaphragm 66, 69 of a microphone (e.g., sensor 80) gets closer to a charged backplate 62, the force on the diaphragm 66, 69 increases—this relationship approximates a negative stiffness. In this example, the moving diaphragm 66, 69 and the charged backplate 62 (or stationary plate)—with a voltage difference between them—functions as a negative stiffness. By applying a voltage to a plate 62 that is near the moving diagram 66, 69, the application of the voltage makes it look like that cavity stiffness is less. In this example, 74 is the electronic circuitry, 76 and 78 are both the backplate. They are the same physical structure but the backplate has holes—the gaps between 76 and 78. In another example, a microphone can be used as a sensoriactuator and a negative stiffness can be achieved by applying, via feedback, a voltage proportional to the microphone output charge, as shown in the above Equation 1. When FB=C, then the sensor stiffness is decreased from $k_1$ to $k_1 - C \cdot B \cdot d \cdot A$. In still another example, a negative stiffness is incorporated into the microphone by applying forces electrostatically. In this example, a microphone used as a sensoriactuator uses a charge amplifier and a feedback voltage is applied. This system can also be built by using a voltage amplifier and applying a feedback charge.

Figure 5:
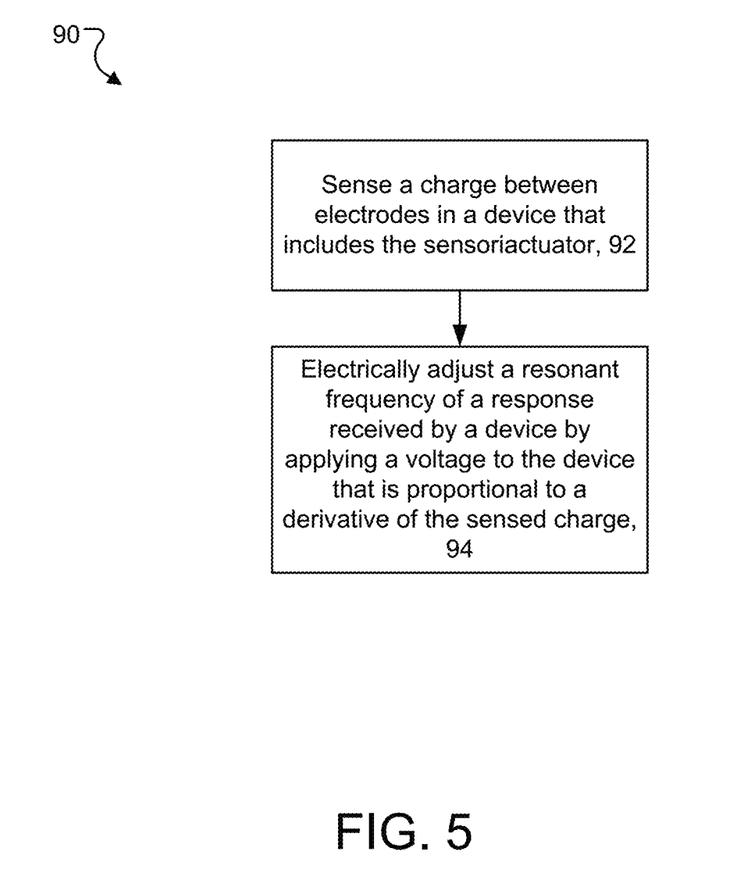
FIGS. 5 and 6 are flowcharts of processes for adjusting resonance frequencies.

Referring to FIG. 5, an electrical device (e.g., a sensoriactuator) implements process 90 in adjusting a resonance frequency of a sensor included in the device. In this example, the sensoriactuator is circuitry (or a sensor, or a sensor and circuitry that are electrically connected to each other). In operation, the sensoriactuator senses (92) a charge between electrodes in a device, such as a MEMS microphone. In response, the sensoriactuator electrically adjusts (94) a resonance frequency of a response of the device by applying a voltage to the device that is proportional to a derivative of the sensed charge, e.g., using the techniques described herein.

Figure 6:
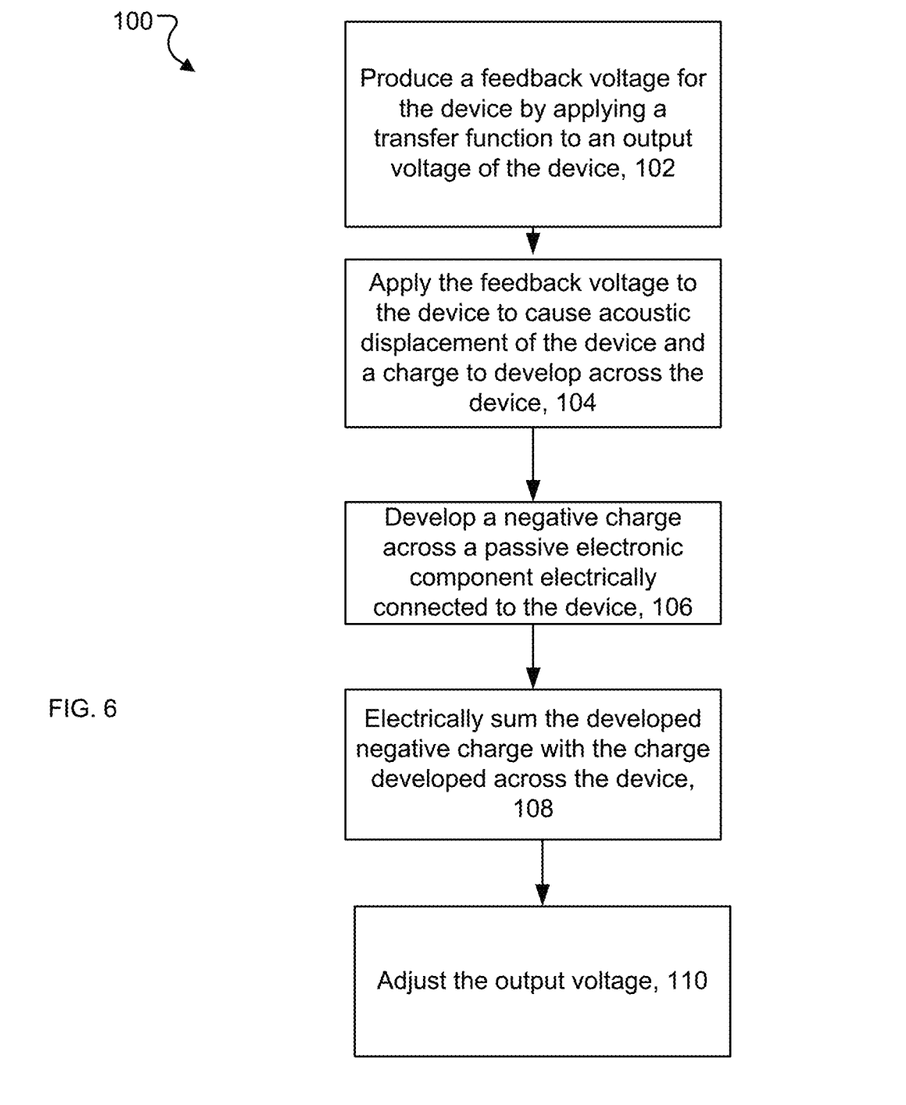

Referring to FIG. 6, an electronic device (e.g., a MEMS device, a microphone, circuitry in a MEMS device, and so forth) implements process 100 for adjusting a resonance frequency of the device (or of a sensor in the device). In operation, the electronic device produces (102) a feedback voltage for the device by applying a transfer function to an output voltage of the device, with the transfer function being based on a gain that is selected to achieve a specified amount of adjustment to the resonance frequency of the device. The electronic device applies (104) the feedback voltage to the device to cause acoustic displacement of the device and a charge to develop across the device, with the acoustic displacement caused by the applied feedback voltage causing an adjustment to the resonance frequency of the device. In this example, the acoustic displacement caused by the feedback voltage is out of phase with the initial displacement due to acoustic pressure and, therefore, the total displacement of the sensor is reduced. The electronic device develops (106) a negative charge across a passive electronic component electrically connected to the device. The electronic device also electrically sums (108) the developed negative charge with the charge developed across the device to cancel the charge developed across the device such that the acoustic displacement caused by the applied feedback voltage remains. The electronic device also adjusts (110) the output voltage of the device, based on the adjusted resonance frequency.

Embodiments can be implemented in digital electronic circuitry, or in computer hardware, firmware, software, or in combinations thereof. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Any of the foregoing can be supplemented by, or incorporated in, ASICs (application-specific integrated circuits).

Other embodiments are within the scope and spirit of the description and the claims. For example, the techniques described herein can be applied to various types of devices, including, e.g., a (MEMS) device, an accelerometer, a transducer, an acoustic sensor, a sensor, a microphone or a gyroscope. Additionally, the techniques described herein for damping a resonance frequency may also be used to adjust a resonance frequency and to increase a resonance frequency.

Additionally, due to the nature of software, functions described above can be implemented using software, hardware, firmware, hardwiring, or combinations of any of these. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of embodiments have been described. Nevertheless, it will be understood that various modifications may be made without departing from the spirit and scope of the claims and the examples of the techniques described herein.

What is claimed is:

1. An electronic device comprising:
   a sensor comprising first and second electrodes, with the sensor being configured for a first acoustic displacement due to input acoustic pressure;
   circuitry configured to measure a charge between the first and second electrodes due to the input acoustic pressure and to apply a voltage to cause a second acoustic displacement of the sensor that is out of phase with the first acoustic displacement, with the applied voltage further causing a charge to develop across the sensor, and with the first and second acoustic displacements causing an increase in damping in a resonance frequency of the sensor, relative to damping of the resonance frequency of the sensor prior to applying the voltage; and
   a passive electronic component configured to cancel out the charge developed across the sensor due to the applied voltage.

2. The electronic device of claim 1, wherein the electronic device is a Micro-Electro-Mechanical Systems (MEMS) device, an accelerometer, a transducer, an acoustic sensor, a microphone or a gyroscope.

3. The device of claim 1, wherein the passive electronic component is operatively connected to the circuitry.

4. The device of claim 1, wherein the circuitry comprises:
   a differential charge amplifier configured to sense the charge between the first and second electrodes due to the input acoustic pressure and to output an output voltage based on the sensed charge.

5. The device of claim 1, wherein the sensor comprises a piezoelectric beam, wherein the first acoustic displacement caused by the input acoustic pressure and the second acoustic displacement caused by the applied voltage is a total acoustic displacement;
   wherein a charge is generated on the sensor due to the total acoustic displacement, in accordance with a relationship between displacement and a charge that is inherent in the piezoelectric beam.

6. The device of claim 1, wherein the applied voltage is proportional to a derivative of the measured charge.

7. The device of claim 1, wherein the sensor and circuitry are configured sensing the charge between the electrodes and for actuating movement of the first sensor based on the applied voltage.

8. The electronic device of claim 1, wherein the sensor, circuitry and passive electronic component are packaged in the electronic device.

9. The device of claim 1, wherein the circuitry comprises:

a differentiator with gain configured to receive the output voltage as an input to the differentiator with gain, further configured to apply a transfer function to the output voltage to produce a feedback voltage that is the applied voltage, wherein the transfer function is based on the gain of the differentiator, with the gain being adjustable to produce a specified amount of damping, and wherein the differentiator is configured to output a feedback voltage that is fed back into the sensor and into the passive electronic component to dampen the resonance frequency of the sensor.

10. The device of claim 1, wherein the sensor comprises a piezoelectric beam, wherein the first acoustic displacement caused by the input acoustic pressure and the second acoustic displacement caused by the applied voltage is a total acoustic displacement;

wherein a charge is generated on the sensor due to the total acoustic displacement, in accordance with a relationship between displacement and a charge that is inherent in the piezoelectric beam.

11. The device of claim 1, wherein the first acoustic displacement caused by the input acoustic pressure and the second acoustic displacement caused by the applied voltage is a total acoustic displacement; and wherein the sensor is configured to aggregate a charge developed across the sensor due to the applied voltage and the charge generated on the sensor due to the total acoustic displacement.

12. The device of claim 1, wherein the circuitry comprises a differential charge amplifier configured to:

develop a negative charge across the passive electronic component to cancel out the charge developed across the sensor due to the applied voltage.

13. The device of claim 1, wherein the circuitry comprises a differential charge amplifier configured to: electronically sum an aggregated charge and the negative charge developed across the passive electronic component such that a charge generated on the sensor due to displacement remains.

14. The device of claim 1, wherein the circuitry comprises a differential charge amplifier configured to: set a gain of the charge amplifier to obtain an appropriate amount of output voltage.

15. The device of claim 1, wherein the circuitry is further configured to apply a transfer function to the output voltage to produce a feedback voltage that is the applied voltage.

16. The device of claim 15, wherein the sensor is configured to receive the feedback voltage being fed back into the sensor to cause the second acoustic displacement of the sensor and a charge to develop across the sensor.

* * * * *

UNITED STATES PATENT AND TRADEMARK OFFICE
CERTIFICATE OF CORRECTION

PATENT NO. : 10,001,391 B1  
APPLICATION NO. : 14/826188  
DATED : June 19, 2018  
INVENTOR(S) : Robert J. Littrell and Karl Grosh Page 1 of 1

It is certified that error appears in the above-identified patent and that said Letters Patent is hereby corrected as shown below:

On the Title Page

Column 1, Line 3, after "0 days." Delete "days."

Signed and Sealed this  
Twenty-eighth Day of May, 2019

Andrei Iancu  
*Director of the United States Patent and Trademark Office*